May 31, 1955  F. W. YOUNG  2,709,558
HEAT RESISTANT CUSHION FOR SUPPORT CLIP
Filed April 18, 1951

INVENTOR
FRANCIS W. YOUNG

BY *Russell M. Lipes, Jr.*
AGENT

United States Patent Office 2,709,558
Patented May 31, 1955

2,709,558

HEAT RESISTANT CUSHION FOR SUPPORT CLIP

Francis W. Young, East Hartford, Conn., assignor to United Aircraft Corporation, East Hartford, Conn., a corporation of Delaware Application April 18, 1951, Serial No. 221,667

4 Claims. (Cl. 248—74)

This invention relates to supporting clips, more particularly to a cushioned clip for use in locations subject to high ambient temperature.

Gas turbine power plants utilize a plurality of metallic clips in various locations for supporting power plant elements. Many of these locations are subject to high temperatures due to their proximity to the hot gases within the power plant. In all of these locations it is necessary to use a cushioned clip as otherwise vibration would cause chafing between the clip and the element being supported, which chafing can in severe cases result in failure of one of the parts. Rubber is the most commonly used cushion material, but natural or synthetic rubber has a tendency to harden and crack above 250° F., a relatively low temperature for gas turbine power plant operation.

An object of this invention is to provide a cushioned clip which can be used in high temperature locations.

Another object of this invention is to provide a cushioned clip which can be used for prolonged periods of operation in ambient temperatures up to about 600° F.

Other objects and advantages will be apparent from the specification and claims and from the accompanying drawing which illustrates a preferred embodiment of the invention.

Figure 1:
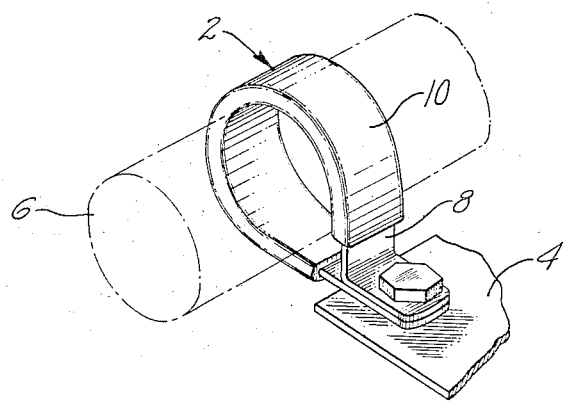
Fig. 1 is a perspective view showing the clip in conduit supporting position.

In Fig. 1, clip 2 in accordance with this invention is shown in position on plate 4 for supporting conduit 6. The clip is comprised of a metallic band 8 surrounded by an impregnated sheath or tube 10 which acts as a cushion to prevent chafing between the band and the conduit and to absorb shock due to vibration and flexing moments.

Figure 2:
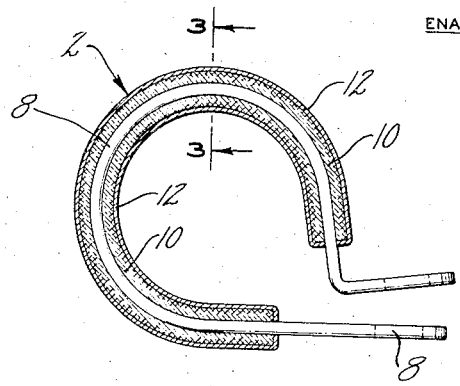
Fig. 2 is a side sectional view.

The details of the clip are shown in Fig. 2. Here the loop of metallic band 8 is covered by sheath 10 made from heat resistant material. Asbestos or fiber glass can be used in view of their well known heat resistant properties since the clip is designed for use in locations subject to ambient temperatures up to about 600° F. The material is braided in order to render the subsequent impregnation more effective and because it is easier to fabricate into a sheath or tube in this form.

The sheath is impregnated with an aluminum-silicone base enamel 12 which adheres the braided fibers together to prevent fraying and which also, to a lesser degree, causes the fibers to adhere to the metallic band. The nature of asbestos or fiber glass is such that the sheath will not withstand the effects of chafing without a proper covering or impregnation. A suitable material for impregnating the clip is an aluminum-silicone base enamel comprised of 15 to 18% resin, 3-4% pigment and 78-82% volatile by weight. The resin is a silicone type, modified if necessary with small amounts of other resins, but free from rosin and rosin derivatives. The pigment is pure aluminum flakes and should not contain a filler or adulterant such as mica.

In general the enamel should be of uniform consistency and free from bubbles, toxic ingredients, grit, rough particles and floating or caked pigments. The moisture content should not exceed 1% by weight.

Figure 3:
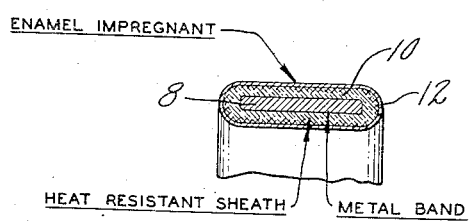
Fig. 3 is a sectional view on line 3—3 in Fig. 2.

After being impregnated, the clip should be allowed to air dry. Fig. 3 shows the metallic band 8 surrounded by the braided sheath 10 which is impregnated with the protective aluminum-silicone enamel 12. This clip has been found to give satisfactory protection to a conduit in locations subject to ambient temperatures up to 600° F.

It is to be understood that the invention is not limited to the specific embodiment herein illustrated and described, but may be used in other ways without departure from its spirit as defined by the following claims.

I claim:

1. An insulating cushion adapted to be used with a support clip in a high temperature environment, said cushion surrounding the clip and being of a braided heat resistant material, the cushion being at least partially impregnated with an aluminum-silicone base enamel, said impregnant affixing said cushion to said clip.

2. An insulating sheath adapted to be used with a support clip in an environment subject to temperatures up to about 600° F., said sheath being of a heat resistant material, the sheath being at least partially impregnated with an enamel having the composition of 15-18% silicone resin, 3-4% pure aluminum flake pigment, and 78-82% volatile by weight.

3. An insulating sheath adapted to be used with a support clip in an environment subject to temperatures up to about 600° F., said sheath being of a heat resistant material, the sheath being at least partially impregnated with an enamel having the composition of 15-18% silicone resin, 3-4% pure aluminum flake pigment, and 78-82% volatile by weight, the resin being free from rosin and rosin derivatives and the pigment being free of filler or adulterant.

4. For a clip used in a high temperature environment, a cushion adapted to surround the clip, said cushion being of heat resistant material, said material being braided so that said cushion can be stretched to closely surround the clip, said cushion being at least partially impregnated with an aluminum-silicone base enamel.

References Cited in the file of this patent

UNITED STATES PATENTS

| | | |
|---|---|---|
| 1,972,523 | Kennedy | Sept. 4, 1934 |
| 2,312,282 | Peet | Feb. 23, 1943 |
| 2,387,295 | Robertson | Oct. 23, 1945 |
| 2,404,473 | Chunn | July 23, 1946 |
| 2,466,912 | Rice | Apr. 12, 1949 |
| 2,480,620 | Warrick | Aug. 30, 1949 |
| 2,492,498 | Pedersen | Dec. 27, 1949 |